(12) United States Patent
Kato et al.

(10) Patent No.: US 8,228,421 B2
(45) Date of Patent: Jul. 24, 2012

(54) TELEVISION CAMERA SYSTEM

(75) Inventors: Hiroshi Kato, Saitama (JP); Chikatsu Moriya, Saitama (JP)

(73) Assignee: Fujinon Corporation, Saitama (JP)

( * ) Notice: Subject to any disclaimer, the term of this patent is extended or adjusted under 35 U.S.C. 154(b) by 936 days.

(21) Appl. No.: 12/195,760

(22) Filed: Aug. 21, 2008

(65) Prior Publication Data
US 2009/0086082 A1 Apr. 2, 2009

(30) Foreign Application Priority Data

Sep. 28, 2007 (JP) .................. P2007-256082
Sep. 28, 2007 (JP) .................. P2007-256083

(51) Int. Cl.
*H04N 5/225* (2006.01)
(52) U.S. Cl. ....................................... 348/360
(58) Field of Classification Search ............ 348/360
See application file for complete search history.

(56) References Cited

U.S. PATENT DOCUMENTS

| | | | | |
|---|---|---|---|---|
| 5,731,920 | A * | 3/1998 | Katsuragawa | 359/827 |
| 5,877,811 | A * | 3/1999 | Iijima et al. | 348/375 |
| 6,407,774 | B1 * | 6/2002 | Mabuchi et al. | 348/335 |
| 6,717,618 | B1 * | 4/2004 | Yoshikawa | 348/360 |
| 6,753,918 | B1 | 6/2004 | Kanayama | |
| 6,757,011 | B1 | 6/2004 | Takeda | |
| 7,362,353 | B2 * | 4/2008 | Kikuchi et al. | 348/207.99 |
| 2004/0165078 | A1 * | 8/2004 | Sasaki et al. | 348/211.4 |
| 2008/0055458 | A1 * | 3/2008 | Moriya | 348/335 |

FOREIGN PATENT DOCUMENTS

| JP | 7-225424 A | | 8/1995 |
|---|---|---|---|
| JP | 2000-66288 A | | 3/2000 |
| JP | 2006-065068 A | * | 3/2006 |
| JP | 3799169 B2 | | 4/2006 |

OTHER PUBLICATIONS

English translation of JP-2006-065068 A Mar. 2006 Hishinuma, Kenji.*

* cited by examiner

*Primary Examiner* — James Hannett
(74) *Attorney, Agent, or Firm* — Birch, Stewart, Kolasch & Birch, LLP

(57) ABSTRACT

An EFP lens 12 is mounted on an ENG camera 14 through a lens supporter 16. Normally, a connector 30 of the EFP lens 12 is joined to a connector 32 of the lens supporter 16, and signal lines from pins of the connector 30 of the EFP lens 12 are connected to corresponding pins of a parallel connector 38 and corresponding pins of a serial connector 62 in the lens supporter 16. When the parallel connector 38 is connected to the connector 34 of the ENG camera 14, it is possible to perform the parallel communication between the EFP lens 12 and the ENG camera 14. When the serial connector 62 is connected to the connector 34 of the ENG camera 14, it is possible to perform the serial communication.

3 Claims, 14 Drawing Sheets

TELEVISION CAMERA SYSTEM

CROSS-REFERENCE TO RELATED APPLICATIONS

This application is based upon and claims the benefit of priority from the Japanese Patent Application Nos. 2007-256082 (filed on Sep. 28, 2007) and 2007-256083 (filed on Sep. 28, 2007); the entire contents of which are incorporated herein by reference.

BACKGROUND OF THE INVENTION

1. Technical Field

The invention relates to a television camera system, and more particularly to a television camera system having an electrical interface for performing signal transmission between a television camera (a camera device) and a television lens (a lens device).

2. Description of the Related Art

Examples of television cameras include a large-size camera (an EFP camera) mostly used in studio and the like and a small-size camera (an ENG camera) carried at the time of new gathering. On the EFP camera, a large-size television lens (EFP lens) having a box shape is used to be mounted, and on the ENG camera, a small-size television lens (ENG lens) is used to be mounted.

Also, the case where the EFP lens is mounted on the ENG camera has increased. In that case, an adapter (a lens supporter) for mechanically and electrically connecting the ENG camera and the EFP lens to each other has been employed (for example, see JP Hei. 7-225424 A).

According to a specification for an interface (a connector) for connecting a television camera and a television lens, 36-pin connectors are provided on mount sections of both of the EFP camera and the EFP lens. Between the EFP camera and the EFP lens, signal transmission is performed through the connector based on the parallel communication or the serial communication. When the parallel communication is performed, all of the 36 pins of the connector are used in a predetermined type signal transmission. When the serial communication is performed, 2 pins of the 36 pins are mostly used. The 2 pins used in serial communication are pin Nos. 8 and pin No. 18, and these 2 pins are used in common in the parallel communication and the serial communication.

In the ENG camera and the ENG lens, 12-pin connectors are provided, and those connectors are connected through a cable. Also, between the ENG camera and the EFP lens, signal transmission is performed through the connectors based on the parallel communication or the serial communication. When the parallel communication is performed, 11 pins among the 12 pins of the connector are used in a predetermined type signal transmission. When serial communication is performed, 2 pins among the 12 pins are mostly used. The 2 pins used in the serial communication are pin Nos. 11 and pin No. 12. The pin No. 12 of these 2 pins is provided only for the serial communication. The pin No. 11 is used in common in the parallel communication and the serial communication, and the pin No. 12 is used only in the serial communication.

According to the related art, in the specification of the interface, when the EFP lens is mounted on the ENG camera through a lens supporter, the signal transmission between the ENG camera and the EFP lens is limited only to the parallel communication. In the lens supporter, pins (pins Nos. 1 to 11), used in the parallel communication, of the connector of the ENG camera are connected to pins (pins Nos. 4 to 6, 8, and 12 to 18), corresponding to the pins used in the parallel communication, of the connector of the EFP lens.

Also, Japanese Patent No. 3799169 (corresponding to U.S. Pat. No. 6,717,618) describes a system that is compatible with both of the signal transmission based on the parallel communication and the signal transmission based on the serial communication when the EFP lens is mounted on the ENG camera through the lens supporter. According to Japanese Patent No. 3799169, it is automatically detected as to whether or not the ENG camera is compatible with the serial communication, and connection between the pins of the connector of the ENG camera and the pins of the connector of the EFP lens are automatically switched in accordance with whether or not the ENG camera is compatible with the serial communication. When the ENG camera is not compatible with the serial communication, in order to perform the signal transmission based on the parallel communication, the pins, used in the parallel communication, of the connector of the ENG camera and the pins of the connector of the EFP lens corresponding thereto are connected to each other. Conversely, when the ENG camera is compatible with the serial communication, in order to perform the signal transmission based on the serial communication, connection positions of the 2 pins, used in the serial communication, of the connector of the EFP lens is switched to be connected to the 2 pins, used in the serial communication, of the connector of the ENG camera.

However, if connection between the pins of the ENG camera and the pins of the EFP lens is configured to be automatically switched over, an increase in processing load and/or an increase in manufacturing cost arises.

SUMMARY OF THE INVENTION

The invention has been made in view of the above circumstances and provides a television camera system that can switch a method of a signal communication between the lens device and the camera device between the parallel communication and the serial communication with a low-cost configuration when the camera device includes one connector having a terminal (a pin) for the parallel communication and a terminal (a pin) for the serial communication and when the lens device originally incompatible with the camera device is mounted.

[1] According to an aspect of the invention, a television camera system includes a lens device, a camera device and a lens supporter. The lens device is originally incompatible with the camera device. The lens device is mounted on a camera device through the lens supporter. The camera device includes one connector for signal transmission between the lens device and the camera device. The connector has a terminal for parallel communication and a terminal for serial communication. The lens device or the lens supporter is provided with a connector for parallel communication and a connector for serial communication which are connectable to the connector of the camera device. A signal line for parallel communication extending from the lens device is connected to the terminal for parallel communication of the connector of the camera device by connecting the connector for parallel communication to the connector of the camera device, to enable signal transmission based on parallel communication between the lens device and the camera device. The signal line for serial communication extending from the lens device is connected to the terminal for serial communication of the connector of the camera device by connecting the connector for serial communication to the connector of the camera device, to enable signal transmission based on serial communication between the lens device and the camera device.

With this configuration, by simply changing the connector connection between the lens device or the lens supporter and the camera device, it is possible to change the method of the signal transmission between the lens device and camera device between the parallel communication and the serial communication.

[2] In the television camera system of [1], the lens supporter may be provided with the connector for parallel communication and the connector for serial communication. A predetermined signal line extending from the lens device may be connected to each of terminals of the connector for parallel communication and each of terminals of the connector for serial communication through a predetermined connector connection between the lens device and the lens supporter.

This configuration is an aspect of the television camera system of [1], and the connector for parallel communication and the connector for serial communication are provided on the lens supporter. Known connection may be available as the connection between the lens device and the lens supporter.

[3] In the television camera system of any one of [1] and [2], any one of the connector for parallel communication and the connector for serial communication may be connected to the connector of the camera device by a cable.

This configuration is an aspect of the television camera system of [1] or [2], and the connector for parallel communication or the connector for serial communication is connected to the connector of the camera device by the cable.

[4] In the television camera system of [1], the connector for parallel communication may include first and second connectors. A cable may include a first cable connector that is connectable to the first connector, a second cable connector that is connectable to the second connector and the connector for serial communication, and a third cable connector that is connectable to the connector of the camera device. The cable may connect terminals of the first and second cable connectors to terminals of the third cable connector. By connecting the first cable connector to the first connector, connecting the second cable connector to the second connector, and connecting the third cable connector to the connector of the camera device, the signal transmission may be performed between the lens device and the camera device based on the parallel communication. By connecting the second cable connector to the connector for serial communication and connecting the third cable connector to the connector of the camera device, the signal transmission may be performed between the lens device and the camera device based on the serial communication.

In this configuration, only the signal line connected to the terminals, being used for the serial communication, of the connector of the camera device is changed between the signal line for parallel communication and the signal line for serial communication in accordance with a selection of a connection destination of the connector of the cable.

[5] According to another aspect of the invention, a television camera system includes a lens device, a camera device, a lens supporter and a changeover switch. The lens device is originally incompatible with the camera device. The lens device is mounted on a camera device through the lens supporter. The changeover switch switches a connection of a signal line between the lens device and the camera device, between a connection mode for a parallel communication and a connection mode for a serial communication, wherein the changeover switch is disposed on the lens supporter and manually operated to switch the connection.

With this configuration, signal transmission between the lens device and the camera device can be switched between the parallel communication and the serial communication by the changeover switch which is manually operated. In this configuration, a judgment means for automatically judging which one of the parallel communication and the serial communication is available in signal transmission between the lens device and the camera device, and an automatic changeover means for automatically switching a connection mode of the signal line between the parallel communication and the serial communication are not needed. Also, it is possible to switch between the parallel communication and the serial communication with a low-cost and simple configuration.

[6] The television camera system of [5] may further include an instruction unit and a signal transmission unit. The instruction unit is disposed on the lens device and is manually operated to instruct as to whether the signal transmission between the lens device and the camera device is fixed to the parallel communication or the serial communication. The signal transmission unit performs the signal transmission between the lens device and the camera device according to the communication method to which the instruction unit instructs to fix.

With such a configuration, judgment means for automatically judging a method of signal transmission between the lens device and the camera device is not needed. Also, connection of the signal line between the lens device and the camera device is manually operated to switch between the connection for parallel communication and the connection for serial communication. Hence, it is possible to switch between the parallel communication and serial the communication with simple configuration.

According to the television camera system of the invention, it is possible to switch a method of signal transmission between the lens device and the camera device between the parallel communication and the serial communication, with a low-cost configuration.

DETAILED DESCRIPTION OF EMBODIMENTS OF THE INVENTION

Hereinafter, a television camera system according to exemplary embodiments of the invention will be described in detail with reference to the accompanying drawings.

Figure 1:
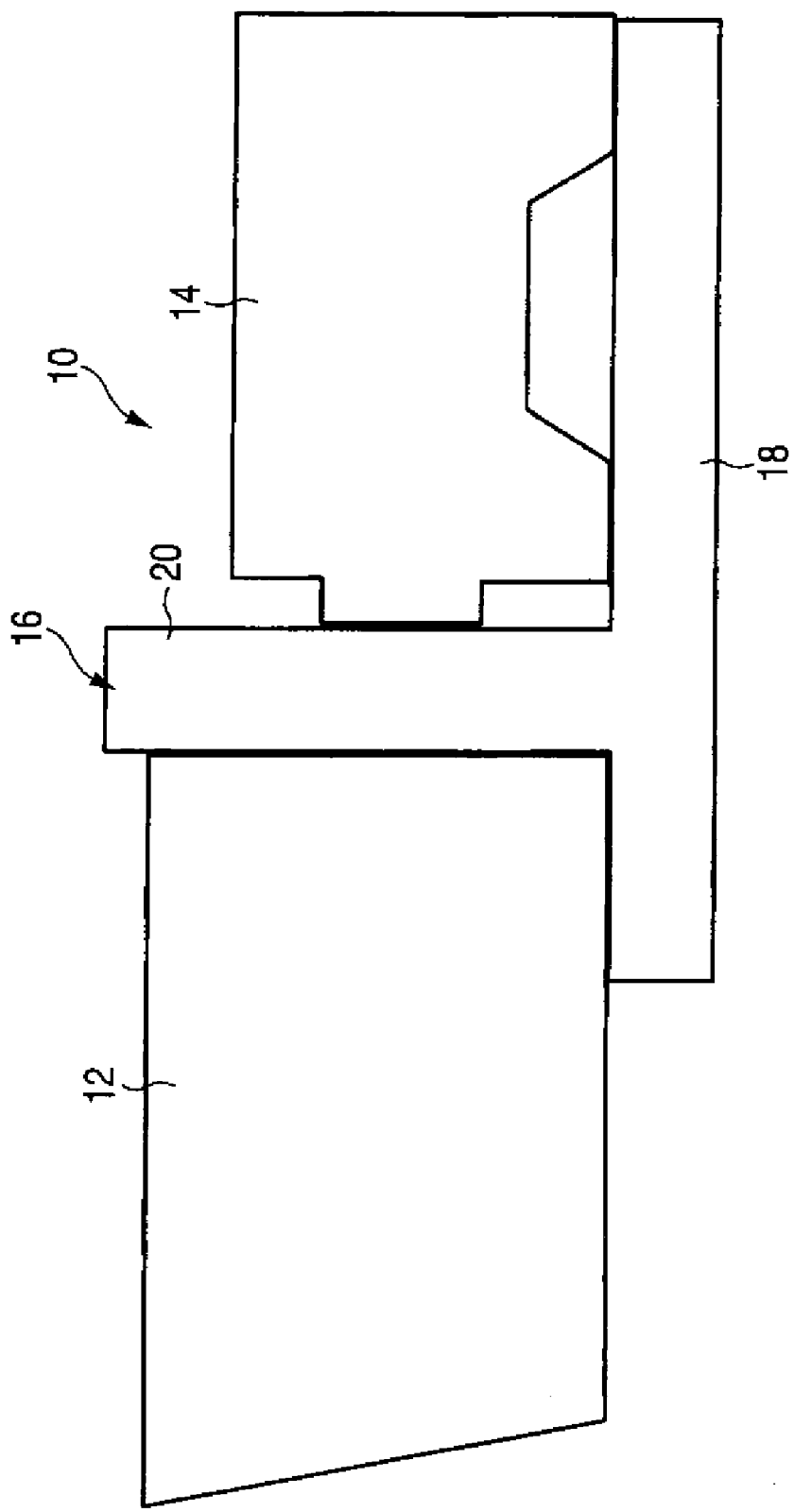
FIG. 1 is an external side view illustrating the configuration of a television camera system according to an embodiment of the invention.

FIG. 1 is an external side view illustrating the configuration of the television camera system according to an embodiment of the invention. The television camera system 10 shown in the figure has an EFP lens 12, an ENG camera 14, and a lens supporter 16. The EFP lens 12 is a lens device for a EFP camera that is mostly used in a studio or the like with being fixed on a tripod, and is a large-size lens device equipped with an image-taking optical system (image-taking lens), a control circuit, and the like in a box-shaped casing.

The ENG camera 14 is mostly carried at the time of news gathering, is used in a state of being shouldered by a camera man, and is a camera device that is originally used with being mounted with not the EFP lens shown in the figure but a small-size lens device (an ENG lens).

The lens supporter 16 is an adapter to which the EFP lens 12 and the ENG camera 14, which have different usages from each other, are mounted so that they can be used together. The lens supporter 16 is fixed on, for example, a tripod. The lens supporter 16 has a mount board section 18 formed in a horizontal direction and a partition section 20 that is made to stand in a vertical direction on the mount board section 18. The EFP lens 12 is fixed on the front side (the left side in the figure) of the partition section 20, and the ENG camera 14 is fixed on the rear side thereof (the right side in the figure).

On the partition section 20, an opening portion (not shown in the figure) is provided. Meanwhile, on the rear side of the EFP lens 12, a bayonet mount provided on the rear end portion of a lens barrel housing an image-taking optical system is protruded. The bayonet mount is inserted through the opening portion of the partition section 20, and is connected to the mount of the ENG camera 14 being fixed on the rear side of the partition section 20. With such a configuration, the image-taking optical system of the EFP lens 12 is mounted on the ENG camera 14.

Also, the EFP lens 12 and the ENG camera 14 are electrically connected to each other through the lens supporter 16 so as to enable transmission and reception of various signals.

Figure 2:
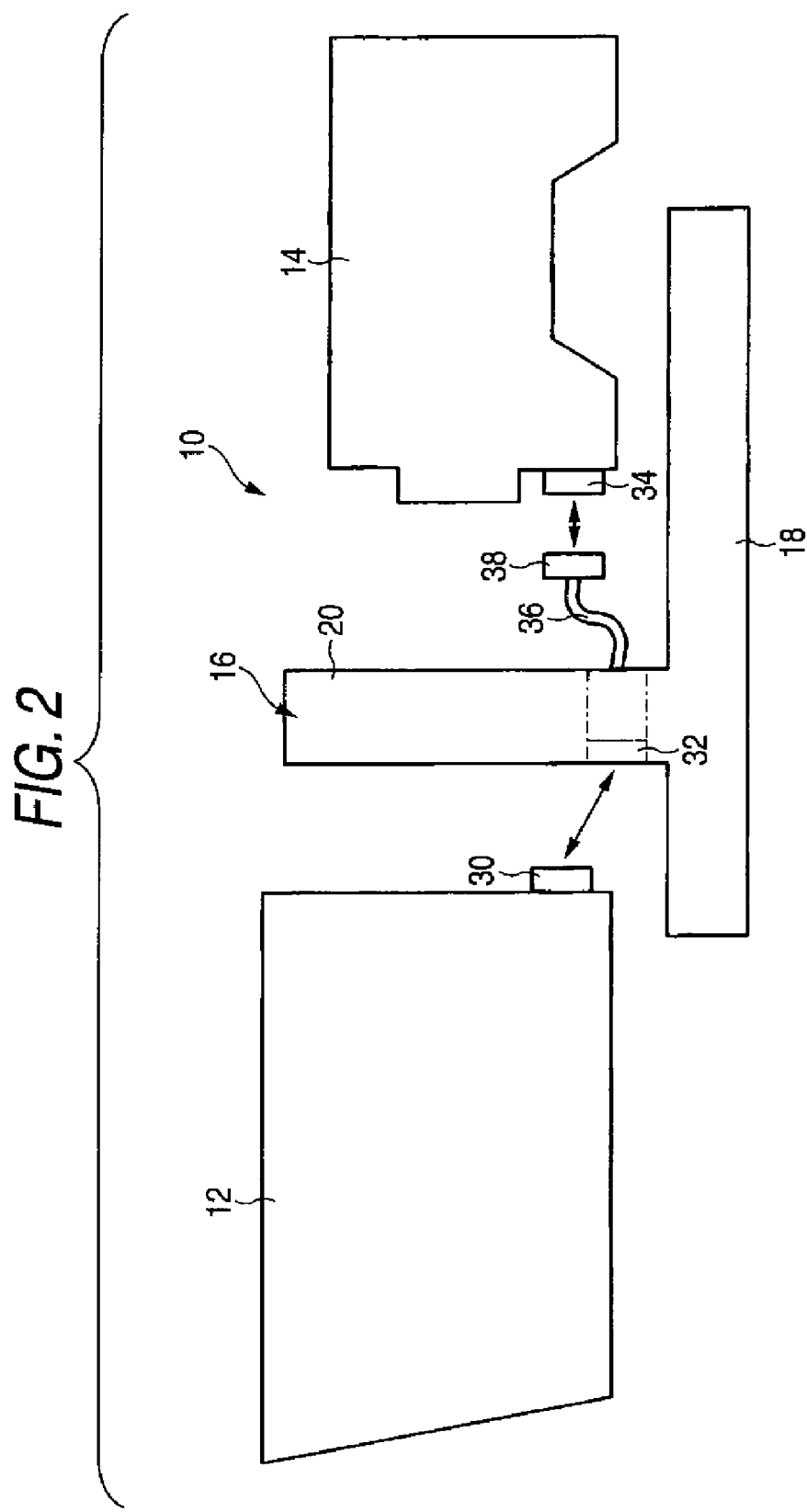
FIG. 2 is a view illustrating a connection mode, according to the related art, of electrical connectors among devices in which signal transmission between an EFP lens and an ENG camera is performed based on the parallel communication.

FIG. 2 is a view illustrating a connection mode, according to the related art, of electrical connectors among devices in which signal transmission between the EFP lens 12 and the ENG camera 14 is performed based on the parallel communication.

On the rear side of the EFP lens 12, a 36-pin connector 30 for transmitting and receiving various signals to and from the camera device (generally the EFP camera) is provided. On the front side of the partition section 20 of the lens supporter 16, a 36-pin lens-side connector 32 connectable to the connector 30 is provided. When the EFP lens 12 is fixed on the lens supporter 16, the connectors 30 and 32 are directly connected to each other.

On the ENG camera 14, a 12-pin connector 34 for transmitting and receiving various signals to and from the lens device (generally the ENG lens) is provided. From the rear side of the partition section 20 of the lens supporter 16, a cable 36 is extended. At the end portion of the cable 36, a 12-pin camera-side connector 38 being configured to be connected to the connector 34 of the ENG camera 14 is provided. The camera-side connector 38 is configured to be connected to the connector 34 of the ENG camera 14.

Meanwhile, the connector 30 of the EFP lens 12 and the lens-side connector 32 of the lens supporter 16 have 36 pins, while the connector 34 of the ENG camera 14 and the camera-side connector 38 of the lens supporter 16 have 12 pins. The numbers of pins (the numbers of the signal lines) are different from each other. Therefore, in order to adapt to types (signal types input to and output from the pins) of the signal lines corresponding to the pins of the connector 34 in the case where the ENG camera 14 performs parallel communication, only pins of signal lines necessary for the ENG camera 14 among the 36 pins of the lens-side connector 32 are connected to corresponding pins of the camera-side connector 38 by internal transmission lines of the lens supporter 16.

Figure 3:
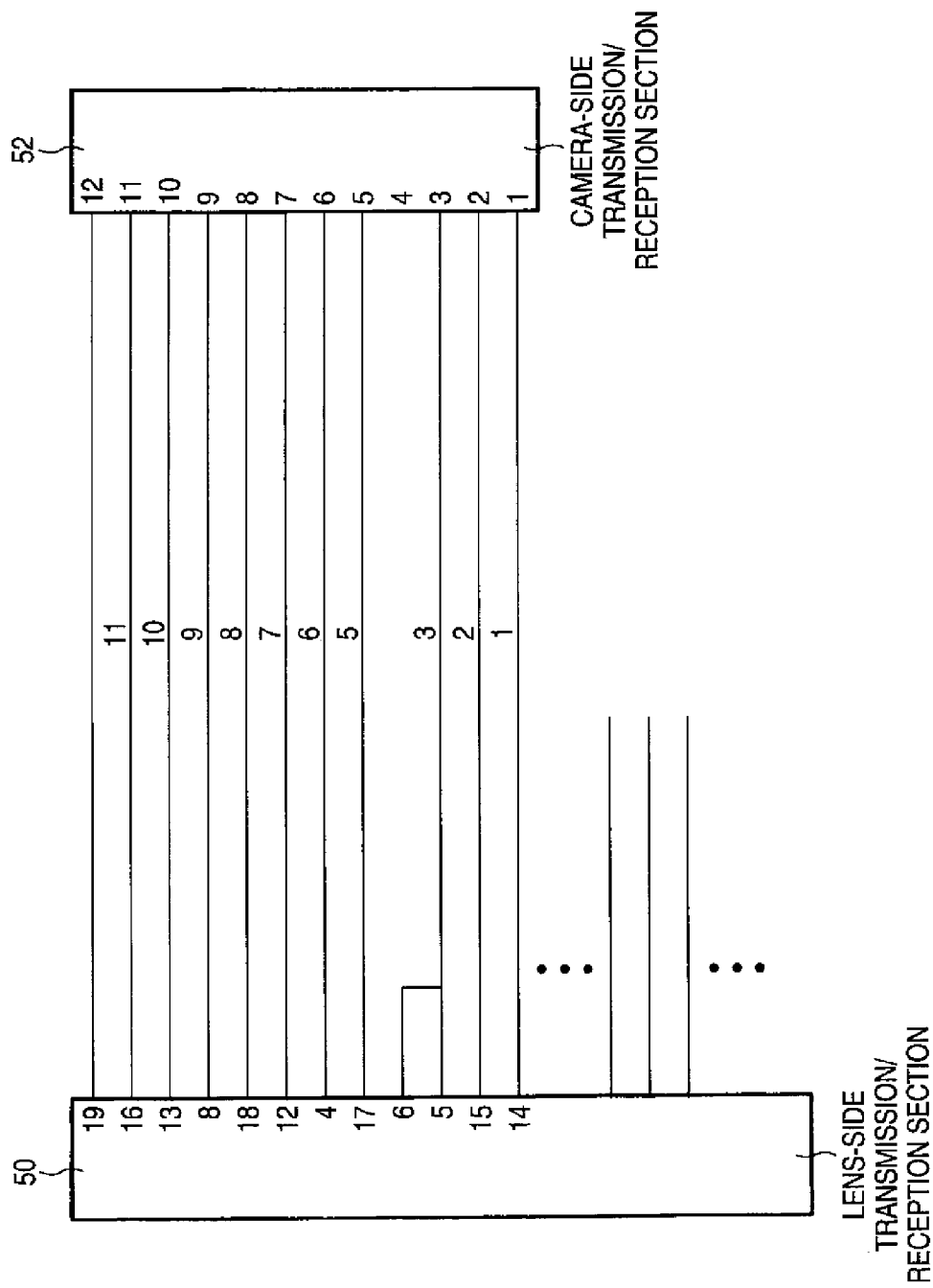
FIG. 3 is a view illustrating a connection state of signal lines when the signal transmission between the EFP lens and the ENG camera is performed based on the parallel communication according to the connection mode shown in FIG. 2.

FIG. 3 is a view illustrating a connection state of the signal lines in the case where signal transmission between the EFP lens 12 and the ENG camera 14 is performed based on the parallel communication, according to the connection mode shown in FIG. 2. In the figure, a lens-side transceiver section 50 is mounted on the EFP lens 12, and is a circuit section for transmitting and receiving signals to and from the camera device. A camera-side transceiver section 52 is mounted on the ENG camera 14, and is a circuit section for transmitting and receiving signals to and from the lens device.

Terminals Nos. 1 to 12 of the camera-side transceiver section 52 represent terminals connected to the pins of the connector 34 of the ENG camera 14 shown in FIG. 2. Numbers of the respective terminals represent corresponding pin numbers of the connector 34. Also, terminals Nos. 4 to 6, 8, and 12 to 18 of the lens-side transceiver section 50 represent terminals connected to the respective pins of the connector 30 of the EFP lens 12 shown in FIG. 2. The respective terminal numbers represent corresponding pin numbers of the connector 30. In the figure, details of terminals of the lens-side transceiver section 50 connected to the other pins of the connector 30 are omitted.

When the EFP lens 12 and the ENG camera 14 are connected through the lens supporter 16 as shown in FIG. 2, the terminals Nos. 4 to 6, 8, and 12 to 18 of the lens-side transceiver section 50 are connected to the terminals Nos. 1 to 3 and 5 to 11 of the camera-side transceiver section 52 by signal lines 1 to 3 and 5 to 11 as shown in FIG. 3.

The terminals Nos. 1 to 3 and 5 to 11 of the camera-side transceiver section 52 are terminals of signal lines used in the parallel communication. When the parallel communication is performed in the EFP lens 12, the terminals Nos. 4 to 6, 8, and 12 to 18 of the lens-side transceiver section 50 corresponding to the types of these signal lines are connected through the signal lines 1 to 3 and 5 to 11. With such a configuration, it is possible to perform signal transmission based on the parallel communication between the EFP lens 12 and the ENG camera 14. Also, terminals of the other signal lines of the lens-side transceiver section 50 connected to pins of the connector 30 of the EFP lens 12 other than pins Nos. 4 to 6, 8, and 12 to 18 are omitted in the figure, but are not connected to the camera-side transceiver section 52, and are in an open state.

In the configuration of the television camera system of the related art, even if the EFP lens 12 and the ENG camera 14 are compatible with the serial communication other than the parallel communication as a signal transmission method, the signal transmission based on the serial communication can not be performed, and only the signal transmission based on the parallel communication can be performed.

Specifically, when the serial communication is performed in the EFP lens 12, the terminals Nos. 8 and 18 (signal lines of pins Nos. 8 and 18 among 36 pins of the connector 30), which are used even in the parallel communication, of the lens-side transceiver section 50 are used. When the parallel communication is performed as shown in FIG. 3, the terminals Nos. 8 and 18 are connected to the terminals Nos. 9 and 8 of the camera-side transceiver section 52, respectively.

However, when serial communication is performed in the ENG camera 14, the terminals Nos. 11 and 12 (signal lines of pins Nos. 11 and 12 among the 12 pins of the connector 34) of the camera transceiver section 52 are used.

Hence, when the serial communication is performed, it is necessary to connect the terminals Nos. 8 and 18 of the lens-side transceiver section 50 to the terminals Nos. 11 and 12 of the camera-side transceiver section 52.

In the television camera system of the related art shown in FIGS. 2 and 3, it is not possible to switch to such a connection state. Thus, the signal transmission between the EFP lens 12 and the ENG camera 14 is limited to the parallel communication.

Accordingly, in the embodiments described below, the EFP lens 12 or the lens supporter 16 is modified without the ENG camera 14 shown in FIGS. 1 and 2 being modified. Thereby, the connection destinations of the terminals Nos. 8 and 18 of the lens-side transceiver section 50 can be switched between the terminals Nos. 9, 8 (for the parallel communication) and the terminals Nos. 11, 12 (for the serial communication) of the camera-side transceiver section 52. Thus, it is possible to perform the signal transmission based on both of the parallel communication and the serial communication between the EFP lens 12 and the ENG camera 14.

Figure 4:
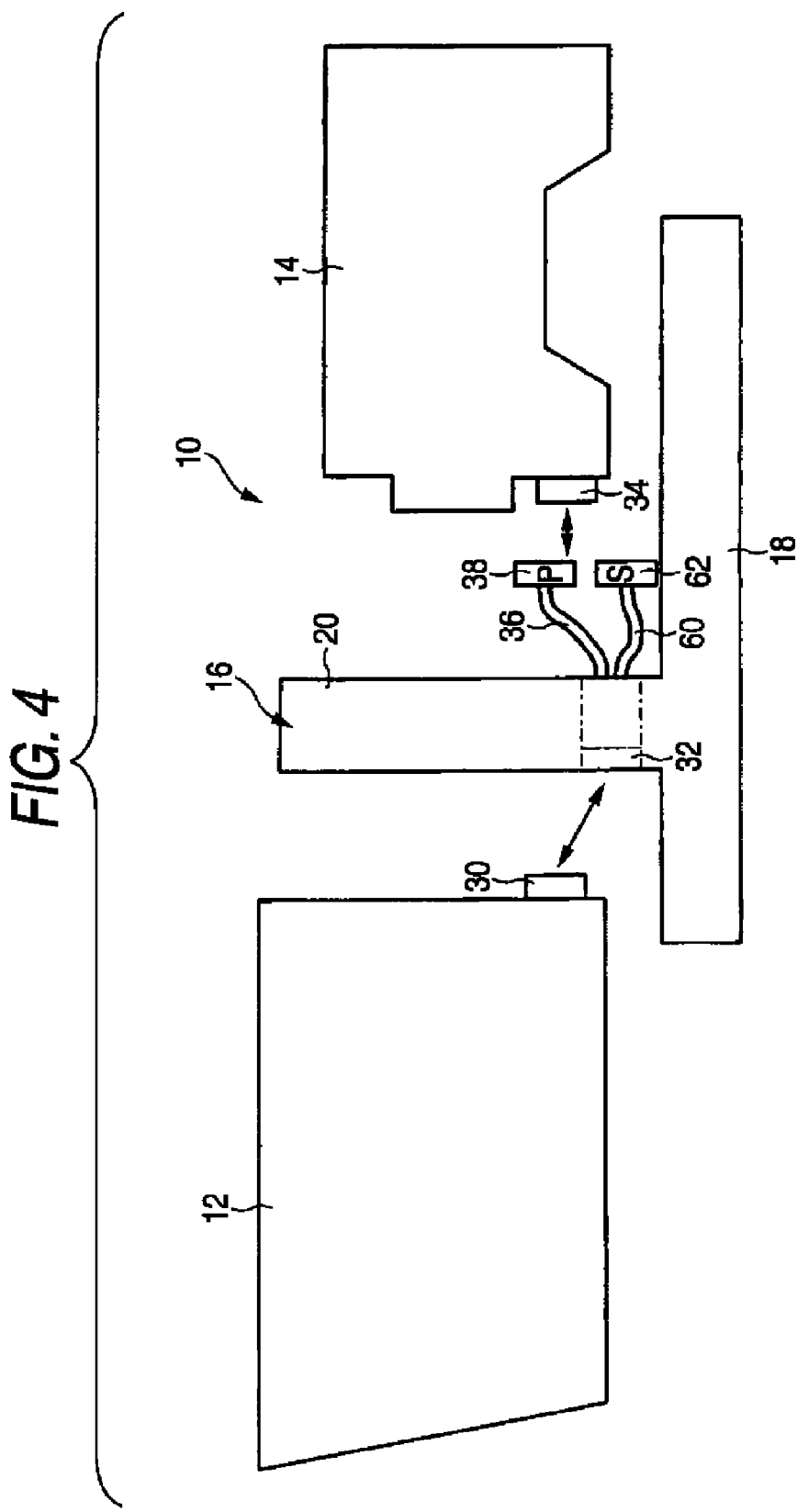
FIG. 4 is a view illustrating a connection mode, according to a first embodiment, of electrical connectors among devices in which signal transmission between the EFP lens and the ENG camera can be performed based on both of the parallel communication and the serial communication.

FIG. 4 is a view illustrating a connection mode, according to a first embodiment, of electrical connectors among devices wherein signal transmission between the EFP lens 12 and the ENG camera 14 can be performed based on both of the parallel communication and the serial communication. Also, the same reference numerals are assigned to elements which are the same as those in FIG. 2, and detailed description thereof will be omitted.

In the figure, when the EFP lens 12 is fixed on the lens supporter 16, similarly to FIG. 2, the 36-pin connector 30 disposed on the rear side of the EFP lens 12 is connected to the 36-pin connector 32 disposed on the front side of the partition section 20 of the lens supporter 16.

The cable 36 extends from the rear side of the partition section 20 of the lens supporter 16 similarly to FIG. 2. At the end portion of the cable 36, the 12-pin camera-side connector 38 connectable to the connector 34 of the ENG camera 14 is provided. Similarly to FIG. 2, when the parallel communication is performed, the camera-side connector 38 is connected to the connector 34 of the ENG camera 14. Also, hereinafter, the camera-side connector 38 may be referred to as a parallel connector 38.

On the other hand, unlike FIG. 2, on the rear side of the partition section 20, a cable 60 different from the cable 36 extends. At the end portion of the cable 60, a serial connector 62 connectable to the connector 34 of the ENG camera 14 is provided. When the serial communication is performed, the serial connector 62 is connected to the connector 34 of the ENG camera 14.

When a user wants to use the parallel communication in the signal transmission between the EFP lens 12 and the ENG camera 14, the user connects the parallel connector 38 of the lens supporter 16 to the connector 34 of the ENG camera 14. When the user wants to use the serial communication, the user connects the serial connector 62 of the lens supporter 16 to the connector 34 of the ENG camera 14. As a result, the signal transmission can be performed in the desired communication method.

Figure 5:
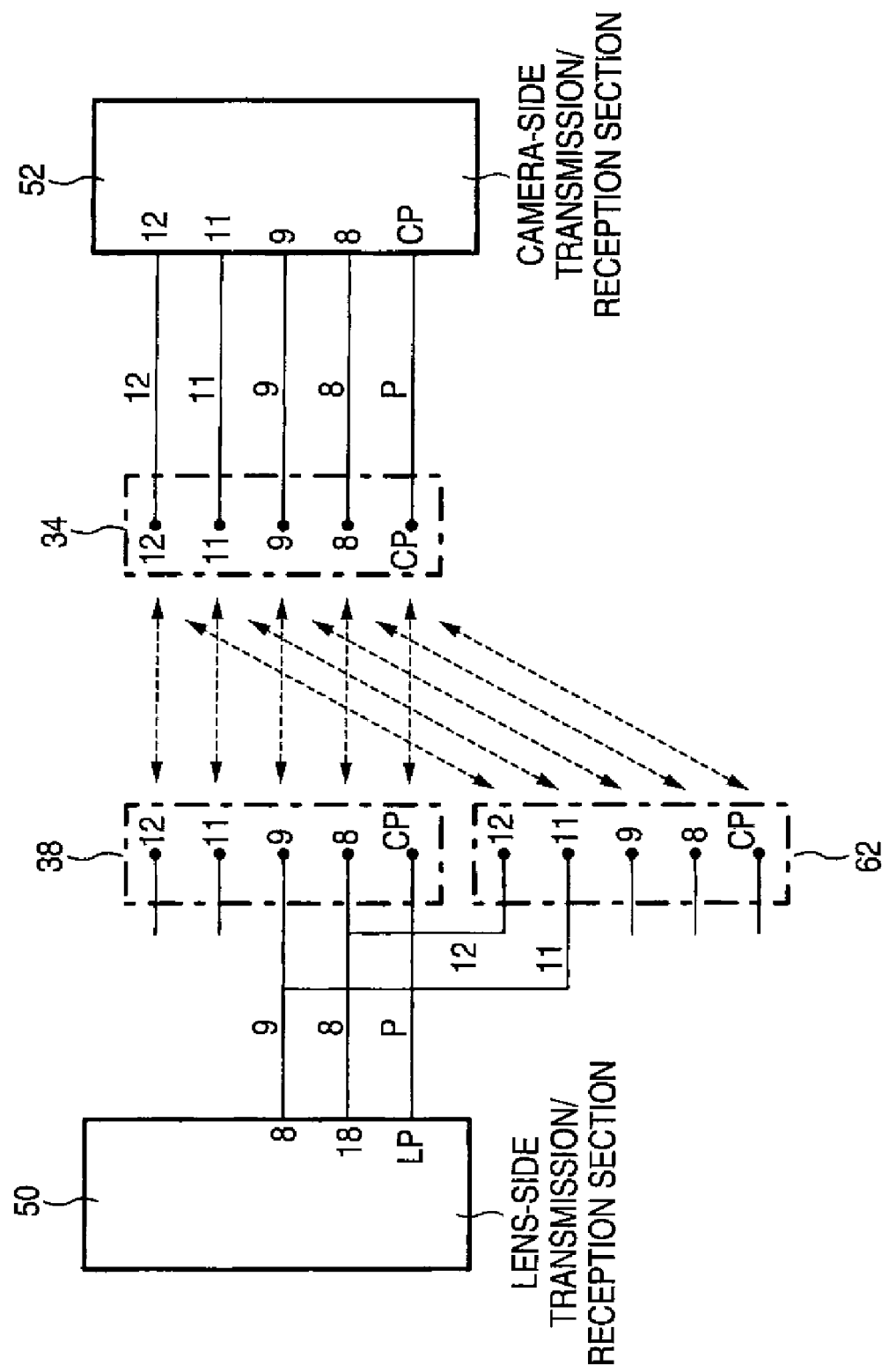
FIG. 5 is a view illustrating a connection state of the signal lines between the EFP lens and the ENG camera according to the connection mode shown in FIG. 4.

FIG. 5 is a view illustrating a connection state of the signal lines between the EFP lens 12 and the ENG camera 14 in the connection mode of the connectors as described above. The same reference numerals are assigned to elements which are the same as or similar to those in FIG. 3, and detailed description thereof will be omitted. Also, terminals and signal lines, which are connected in the lens-side transceiver section 50 and camera-side transceiver section 52 when the parallel communication is performed, wherein the terminals are other than the terminals Nos. 8 and 18 of the lens-side transceiver section 50 and other than the terminals Nos. 8, 9, 11, and 12 of the camera-side transceiver section 52, and the signal lines connect the terminals, are represented by two terminals (LP and CP) and one signal line P, respectively (it is also the same in the following embodiments).

In the figure, pin Nos. of the parallel connector 38 of the lens supporter 16 and pin numbers of the serial connector 62 of the lens supporter 16 represent connected pin Nos. of the connector 34 when the connectors 38 and 62 are joined to the connector 34 of the ENG camera 14.

The terminals Nos. 8 and 18 of the lens-side transceiver section 50 are connected to the pins Nos. 9 and 8 of the parallel connector 38. Also, the terminal No. LP of the lens-side transceiver section 50 is connected to the pin No. CP of the parallel connector 38, and the pin No. 12 of the parallel connector 38 is opened. Furthermore, the pin No. 11 of the parallel connector 38 is connected to the terminal No. 16 of the lens-side transceiver section 50, but this connection is omitted in the figure.

With such a configuration, when the parallel connector 38 is joined to the connector 34 of the ENG camera 14, the terminals Nos. 8 and 18 of the lens-side transceiver section 50 are connected to the terminals Nos. 9 and 8 of the camera-side transceiver section 52 via the signal lines 9 and 8. Also, the other terminals (the terminal No. LP including the terminal No. 16), which are used in the parallel communication of the lens-side transceiver section 50, are connected to the terminal No. CP (including the terminal No. 11) of the camera-side transceiver section 52. Accordingly, it is possible to perform signal transmission based on the parallel communication.

Meanwhile, the terminals Nos. 8 and 18 of the lens-side transceiver section 50 are connected to the pins Nos. 11 and 12 of the serial connector 62. The other pins of the serial connector 62 are opened.

With such a configuration, when the serial connector 62 is joined to the connector 34 of the ENG camera 14, the terminals Nos. 8 and 18 of the lens-side transceiver section 50 are connected to the terminals Nos. 11 and 12 of the camera-side transceiver section 52 via the signal lines 11 and 12. Accordingly, it is possible to perform signal transmission based on the serial communication.

Figure 6:
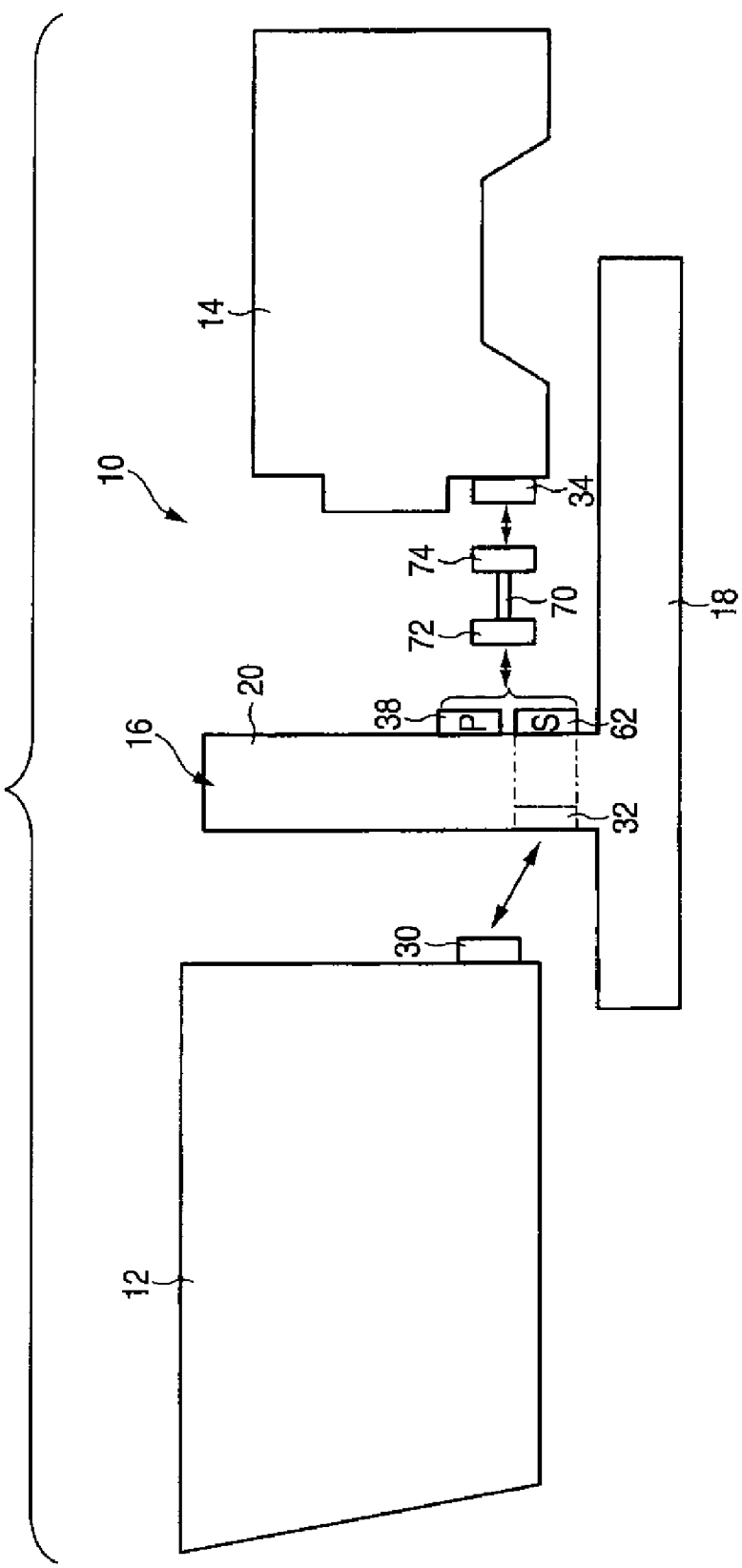
FIG. 6 is a view illustrating a connection mode, according to a second embodiment, of electrical connectors among devices in which signal transmission between the EFP lens and the ENG camera can be performed based on both of the parallel communication and the serial communication.

FIG. 6 is a view illustrating a connection mode, according to a second embodiment, of electrical connectors among devices wherein signal transmission between the EFP lens 12 and the ENG camera 14 can be performed based on both of the parallel communication and the serial communication. The same reference numerals are assigned to elements which are the same as or similar to those in FIG. 4, and detailed description thereof will be omitted.

In the figure, when the EFP lens 12 is fixed on the lens supporter 16, similarly to FIGS. 2 and 4, the 36-pin connector 30 disposed on the rear side of the EFP lens 12 is connected to the 36-pin connector 32 disposed on the front side of the partition section 20 of the lens supporter 16.

Unlike FIG. 4, on the rear side of the partition section 20 of the lens supporter 16, the cables 36 and 60 are not provided, and the serial connector 62 of 12 pins and the parallel connector 38 of 12 pins are directly provided on the wall thereof. A 12-pin connector 72 disposed at one end of a cable 70 can be joined to the connectors 38 and 62, and a 12-pin connector 74 disposed at the other end of the cable 70 can be joined to the connector 34 of the ENG camera 14.

When a user wants to use the parallel communication in the signal transmission between the EFP lens 12 and the ENG camera 14, the user connects the parallel connector 38 of the lens supporter 16 and the connector 34 of the ENG camera 14 by the cable 70. Specifically, the connector 72 of the cable 70 is joined to the parallel connector 38, and the connector 74 of the cable 70 is joined to the connector 34 of the ENG camera 14.

On the other hand, when the user wants to use the serial communication in the signal transmission between the EFP lens 12 and the ENG camera 14, the user connects the serial connector 62 of the lens supporter 16 and the connector 34 of the ENG camera 14 by the cable 70. Specifically, the connector 72 of the cable 70 is joined to the serial connector 62, and the connector 74 of the cable 70 is joined to the connector 34 of the ENG camera 14.

Figure 7:
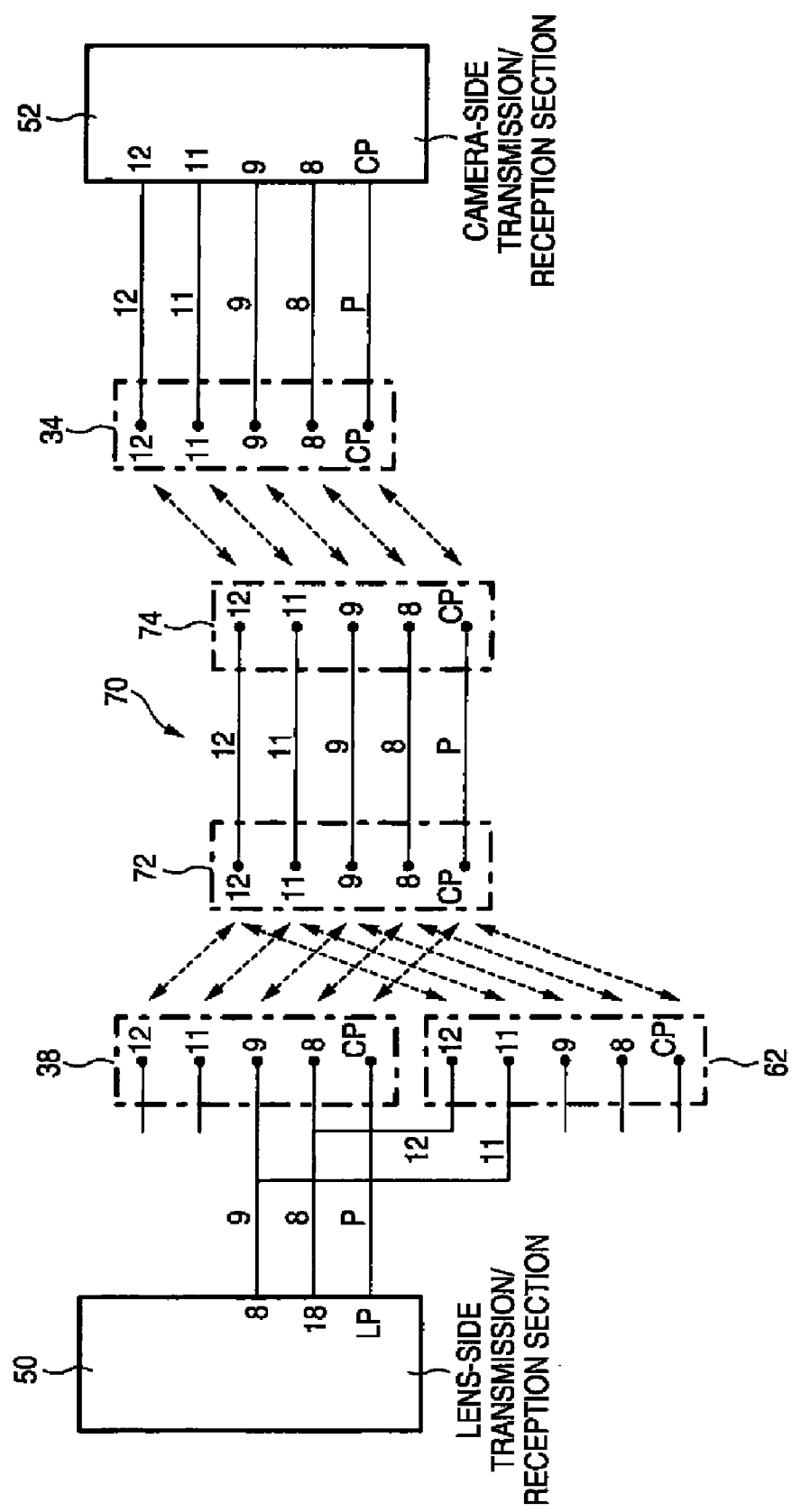
FIG. 7 is a view illustrating a connection state of the signal lines between the EFP lens and the ENG camera according to the connection mode shown in FIG. 6.

FIG. 7 is a view illustrating a connection state of the signal lines between the EFP lens 12 and the ENG camera 14 in the connection mode of the connectors as described above. The same reference numerals are assigned to elements which are the same as or similar to those in FIG. 5, detailed description thereof will be omitted.

The configuration shown in this figure is different from the configuration shown in FIG. 5 in that the parallel connector 38 or the serial connector 62 of the lens supporter 16 is not directly connected to the connector 34 of the ENG camera 14 but the pins of the parallel connector 38 or the serial connector 62 are connected to the connector 34 of the ENG camera 14 through the cable 70.

When the connector 72 of the cable 70 is joined to the parallel connector 38 and when the connector 74 of the cable 70 is joined to the connector 34 of the ENG camera 14, the terminals Nos. 8 and 18 of the lens-side transceiver section 50 are connected to the terminals Nos. 9 and 8 of the camera-side transceiver section 52 by the signal lines 9 and 8. Also, the other terminals (the terminal No. LP including the terminal No. 16), which are used in the parallel communication of the lens-side transceiver section 50, are connected to the terminal No. CP (including the terminal No. 11) of the camera-side transceiver section 52. Accordingly, it is possible to perform the signal transmission based on the parallel communication.

On the other hand, when the connector 72 of the cable 70 is joined to the serial connector 62 and when the connector 74 of the cable 70 is joined to the connector 34 of the ENG camera 14, the terminals Nos. 8 and 18 of the lens-side transceiver section 50 are connected to the terminals Nos. 11 and 12 of the camera-side transceiver section 52 by the signal lines 11 and 12. Accordingly, it is possible to perform the signal transmission based on the serial communication.

Also, in the first and second embodiment, the parallel connector 38 and the serial connector 62 are provided on the lens supporter 16. However, any one or both of them may be provided on the EFP lens 12.

Figure 8:
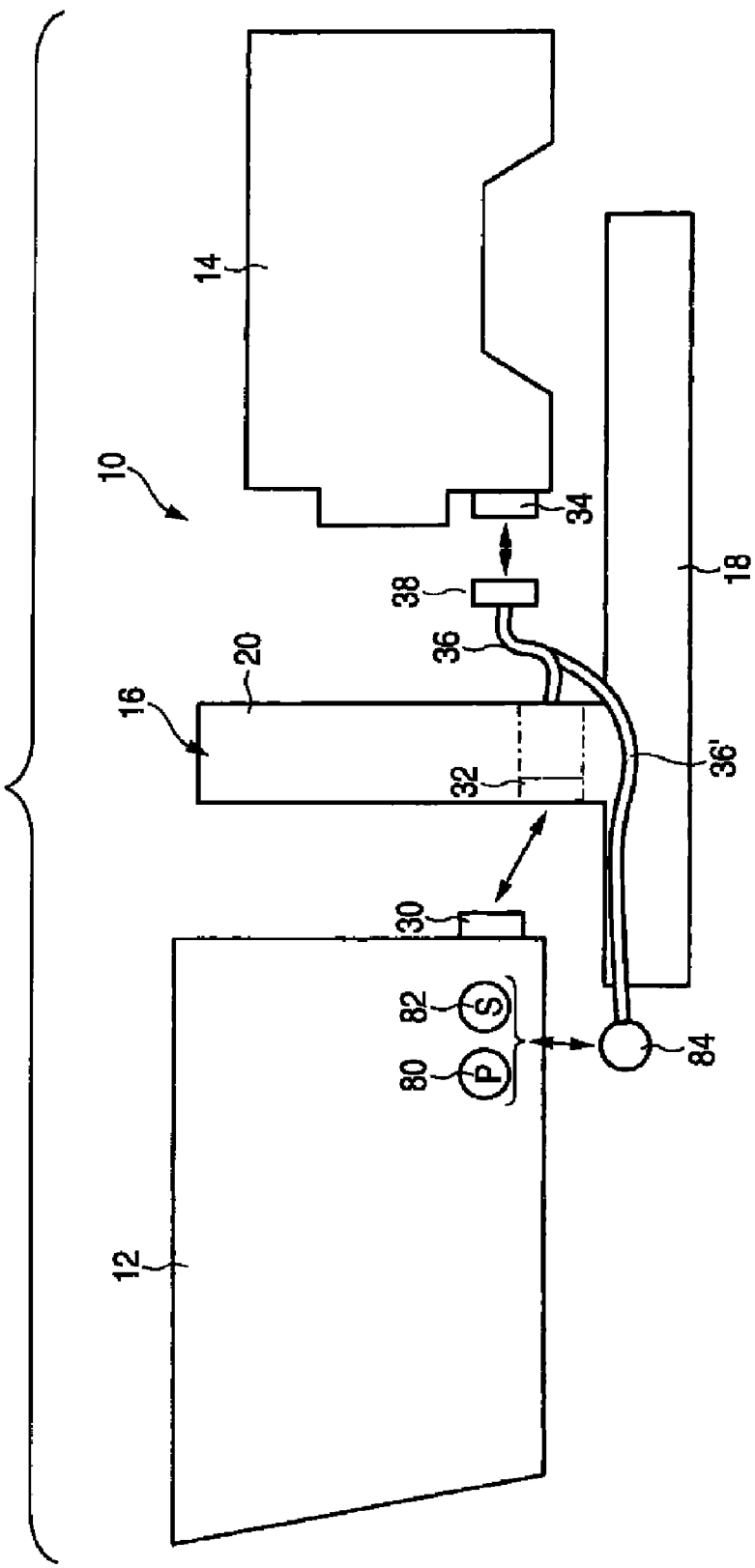
FIG. 8 is a view illustrating a connection mode, according to a third embodiment, of electrical connectors among devices wherein signal transmission between the EFP lens and the ENG camera can be performed based on both of the parallel communication and the serial communication.

FIG. 8 is a view illustrating a connection mode, according to a third embodiment, of electrical connectors among devices wherein signal transmission between the EFP lens 12 and the ENG camera 14 can be performed based on both of the parallel communication and the serial communication. The same reference numerals are assigned to elements which are the same as or similar to those in FIG. 2, and detailed description thereof will be omitted.

In the figure, when the EFP lens 12 is fixed on the lens supporter 16, similarly to FIG. 2, the 36-pin connector 30 disposed on the rear side of the EFP lens 12 is connected to the 36-pin connector 32 disposed on the front side of the partition section 20 of the lens supporter 16.

The cable 36 extends from the rear side of the partition section 20 of the lens supporter 16 similarly to FIG. 2. At the end portion of the cable 36, the 12-pin camera-side connector 38 connectable to the connector 34 of the ENG camera 14 is provided. Similarly to FIG. 2, when the parallel communication or the serial communication is performed, the camera-side connector 38 is connected to the connector 34 of the ENG camera 14.

On the other hand, not only the connector 30 but also, for example, a 4-pin parallel connector 80 and a serial connector 82 are provided on the EFP lens 12. Also, a cable 36' branches off the cable 36. At the end portion of the cable 36', a connector 84 connectable to the connectors 80 and 82 is provided.

When a user wants to use the parallel communication in the signal transmission between the EFP lens 12 and the ENG camera 14, the user connects the connector 84 of the cable 36' to the parallel connector 80 of the EFP lens 12. When the user wants to use the serial communication, the user connects the connector 84 of the cable 36' to the serial connector 82 of the EFP lens 12. As a result, the signal transmission can be performed based on the desired communication method.

Figure 9:
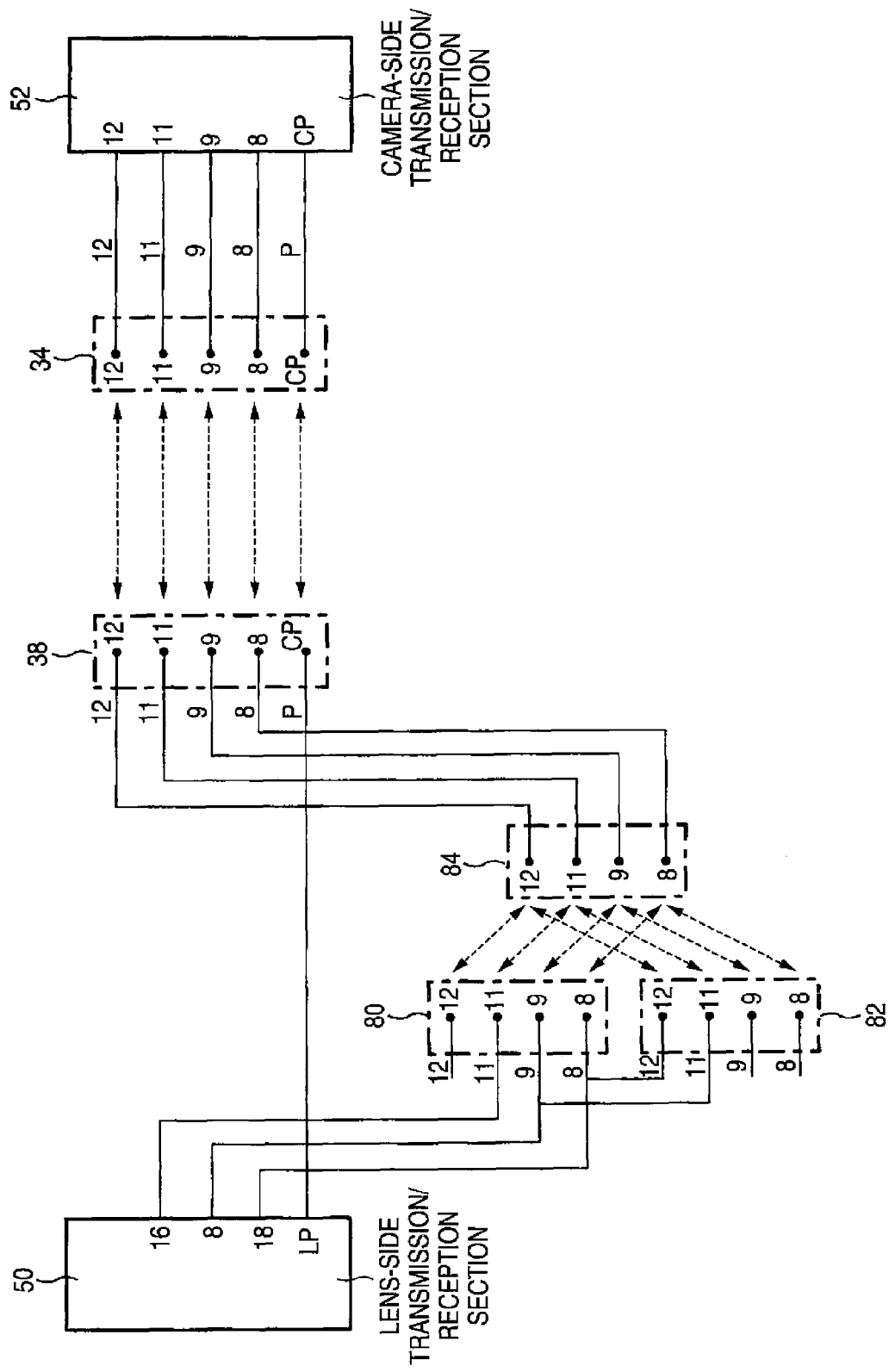
FIG. 9 is a view illustrating a connection state of the signal lines between the EFP lens and the ENG camera according to the connection mode shown in FIG. 8.

FIG. 9 is a view illustrating a connection state of the signal lines between the EFP lens 12 and the ENG camera 14 in the connection mode of the connectors as described above. The same reference numerals are assigned to elements which are the same as or similar to those in FIGS. 3 and 5, and detailed description thereof will be omitted.

In the figure, the terminal No. LP of the lens-side transceiver section 50 is connected to the pin No. CP of the camera-side connector 38 of the lens supporter 16, and the pins Nos. 8, 9, 11, and 12 of the camera-side connector 38 are connected to the pins Nos. 8, 9, 11, and 12 of the connector 84 of the cable 36'.

Meanwhile, pins Nos. 8, 9, and 11 of the parallel connector 80 of the EFP lens 12 are connected to the terminals Nos. 18, 8, and 16 of the lens-side transceiver section 50, and pin No. 12 of the parallel connector 80 is opened.

Also, the pins Nos. 11 and 12 of the serial connector 82 of the EFP lens 12 are connected to the terminals Nos. 8 and 18 of the lens-side transceiver section 50, and pins Nos. 8 and 9 of the serial connector 82 are opened.

Accordingly, when the camera-side connector 38 of the lens supporter 16 is joined to the connector 34 of the ENG camera 14 and when the connector 84 of the cable 36' is joined to the parallel connector 80 of the EFP lens 12, the terminals Nos. 8 and 18 of the lens-side transceiver section 50 are connected to the terminals Nos. 9 and 8 of the camera-side transceiver section 52, and the terminal No. 16 of the lens transceiver section 50 is connected to the terminal No. 11 of the camera-side transceiver section 52. With such a configuration, it is possible to perform the signal transmission based on the parallel communication.

Meanwhile, when the camera-side connector 38 of the lens supporter 16 is joined to the connector 34 of the ENG camera 14 and when the connector 84 of the cable 36' is joined to the serial connector 82 of the EFP lens 12, the terminals Nos. 8 and 18 of the lens-side transceiver section 50 are connected to the terminals Nos. 11 and 12 of the camera-side transceiver section 52. Accordingly, it is possible to perform the signal transmission based on the serial communication.

In the first to third embodiments, the parallel communication and the serial communication are switched depending on the connection position of the connector of the cable, but may be switched by a switch that is manually operated.

Figure 10:
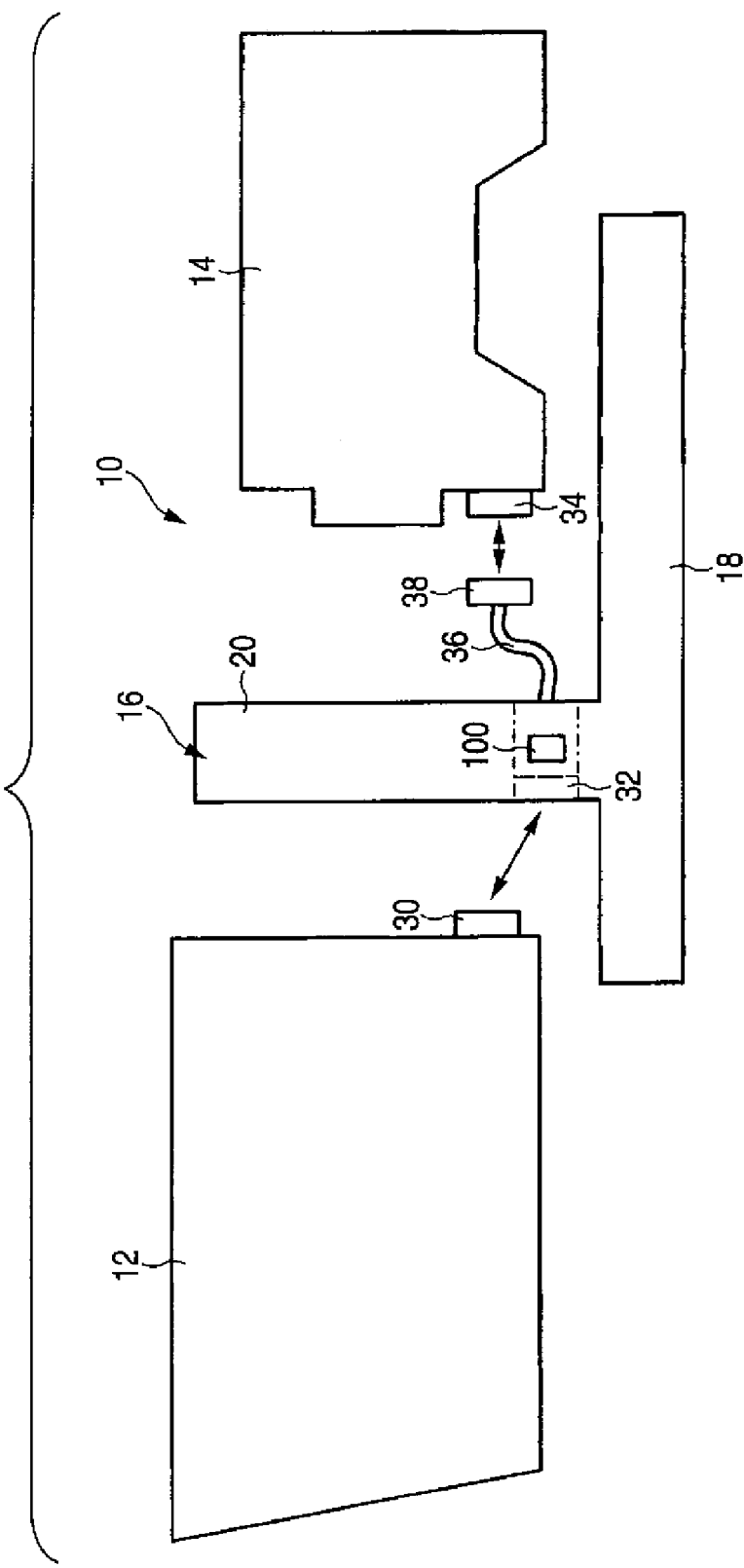
FIG. 10 is a view illustrating a connection mode, according to a fourth embodiment, of electrical connectors among devices in which signal transmission between the EFP lens and the ENG camera can be performed based on both of the parallel communication and the serial communication.

FIG. 10 is a view illustrating a connection mode, according to a fourth embodiment, of electrical connectors among devices wherein signal transmission between the EFP lens 12 and the ENG camera 14 can be performed based on both of the parallel communication and the serial communication. The connection mode in the figure is the same as the connection mode shown in FIG. 2. Meanwhile, a switch 100 is provided on the lens supporter 16.

Figure 11:
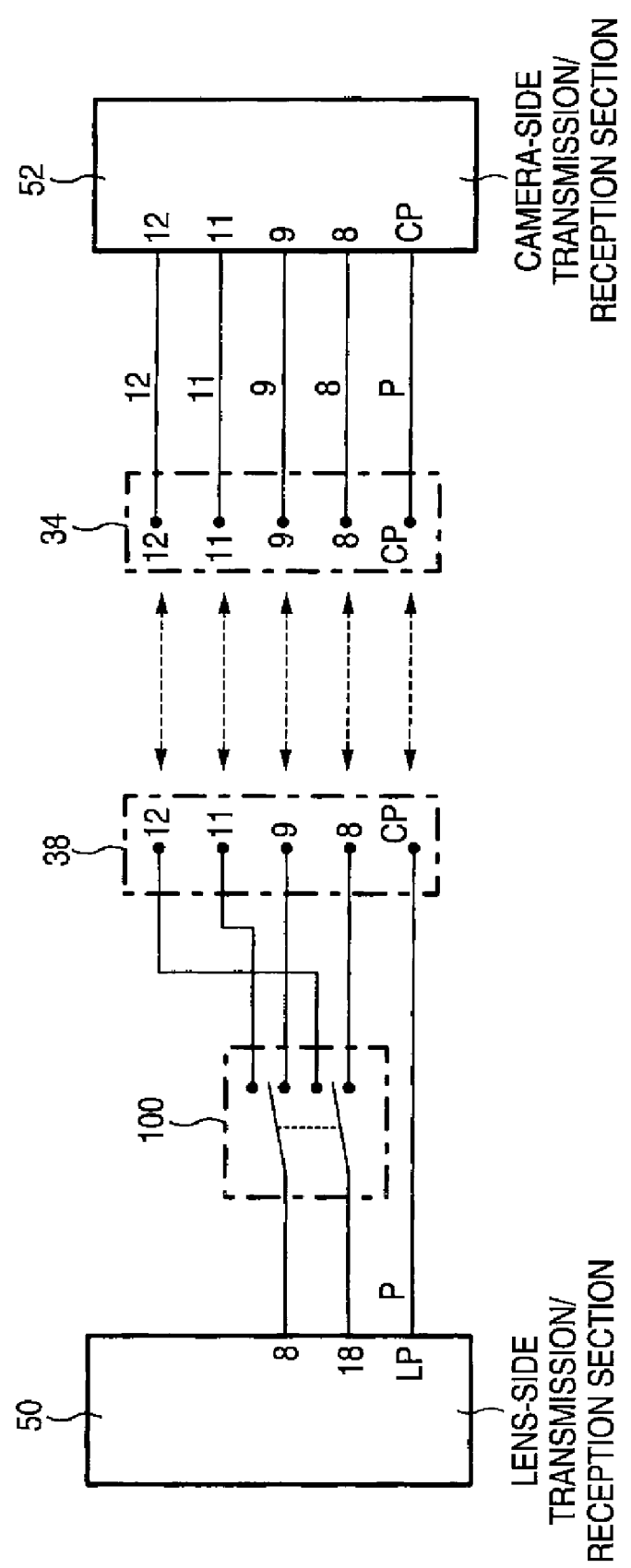
FIG. 11 is a view illustrating a connection state of the signal lines between the EFP lens and the ENG camera according to the connection mode shown in FIG. 10.

FIG. 11 is a view illustrating a connection stat of the signal lines between the EFP lens 12 and the ENG camera 14. The connection state can be switched by the switch 100 of the lens supporter 16 shown in FIG. 10 between (i) the case where the terminals Nos. 8 and 18 of the lens-side transceiver section 50 are connected to the terminals Nos. 9 and 8 of the camera-side transceiver section 52 and (ii) the case where the terminals Nos. 8 and 18 of the lens-side transceiver section 50 are connected to the terminals Nos. 11 and 12 of the camera-side transceiver section 52. With such a configuration, when a user wants to use the parallel communication, the user connects the terminals Nos. 8 and 18 of the lens-side transceiver section 50 to the terminals Nos. 9 and 8 of the camera-side transceiver section 52 by using the switch 100. When the user wants to use the serial communication, the user connects the terminals Nos. 8 and 18 of the lens-side transceiver section 50 to the terminals Nos. 11 and 12 of the lens-side transceiver section 52 by using the switch 100.

Furthermore, the switch 100 may be provided in the EFP lens 12. Alternatively, the switch 100 may be provided in the lens supporter 16.

According to the first to fourth embodiments, there is no judgment means for judging as to whether or not the ENG camera 14 is compatible with the serial communication as described in Japanese Patent No. 3799169 (corresponding to U.S. Pat. No. 6,717,618), which has been referred to in the "Background of the Invention" section" of this specification. Furthermore, there is no changeover means for automatically switching a connection mode of the signal lines between the EFP lens 12 and the ENG camera 14 between the parallel communication mode and the serial communication mode, based on the judgment result of the judgment means. Accordingly, a user connects a cable or manipulates a switch so as to switch the connection of the signal lines between the EFP lens 12 and the ENG camera 14 between the parallel communication mode and the serial communication mode. Hence, the switching between the parallel communication and the serial communication can be achieved with a low-cost and simple configuration. Also, this configuration can solve the following problem, that is, when a communication error occurs in the serial communication, the connection is automatically switched to the connection mode for the parallel communication, and thus it takes time to return to a normal communication state.

Figure 12:
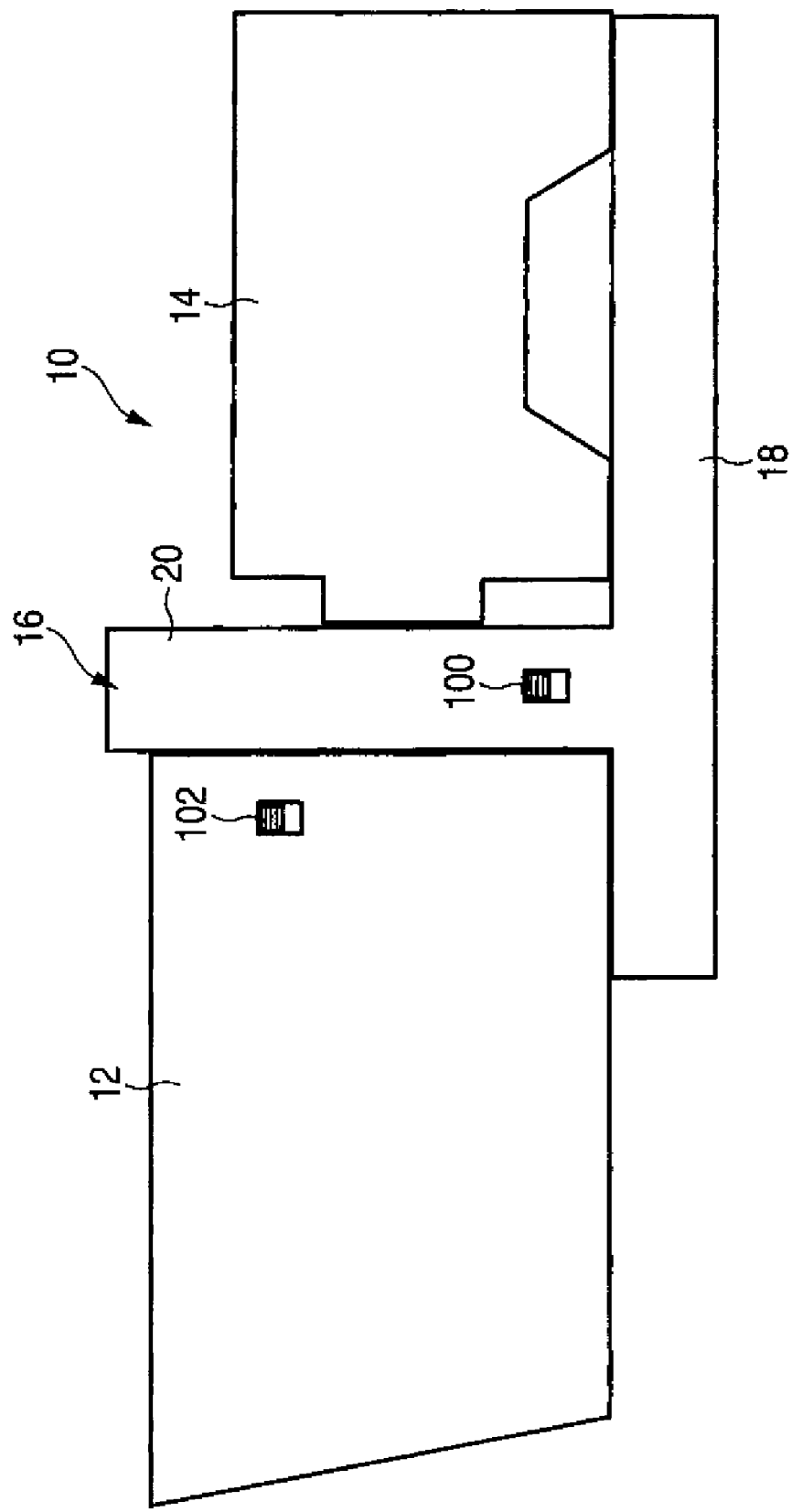
FIG. 12 is an external side view illustrating the configuration of a television camera system according to a fifth embodiment.

FIG. 12 is an external side view illustrating the configuration of a television camera system according to a fifth embodiment.

Figure 13:
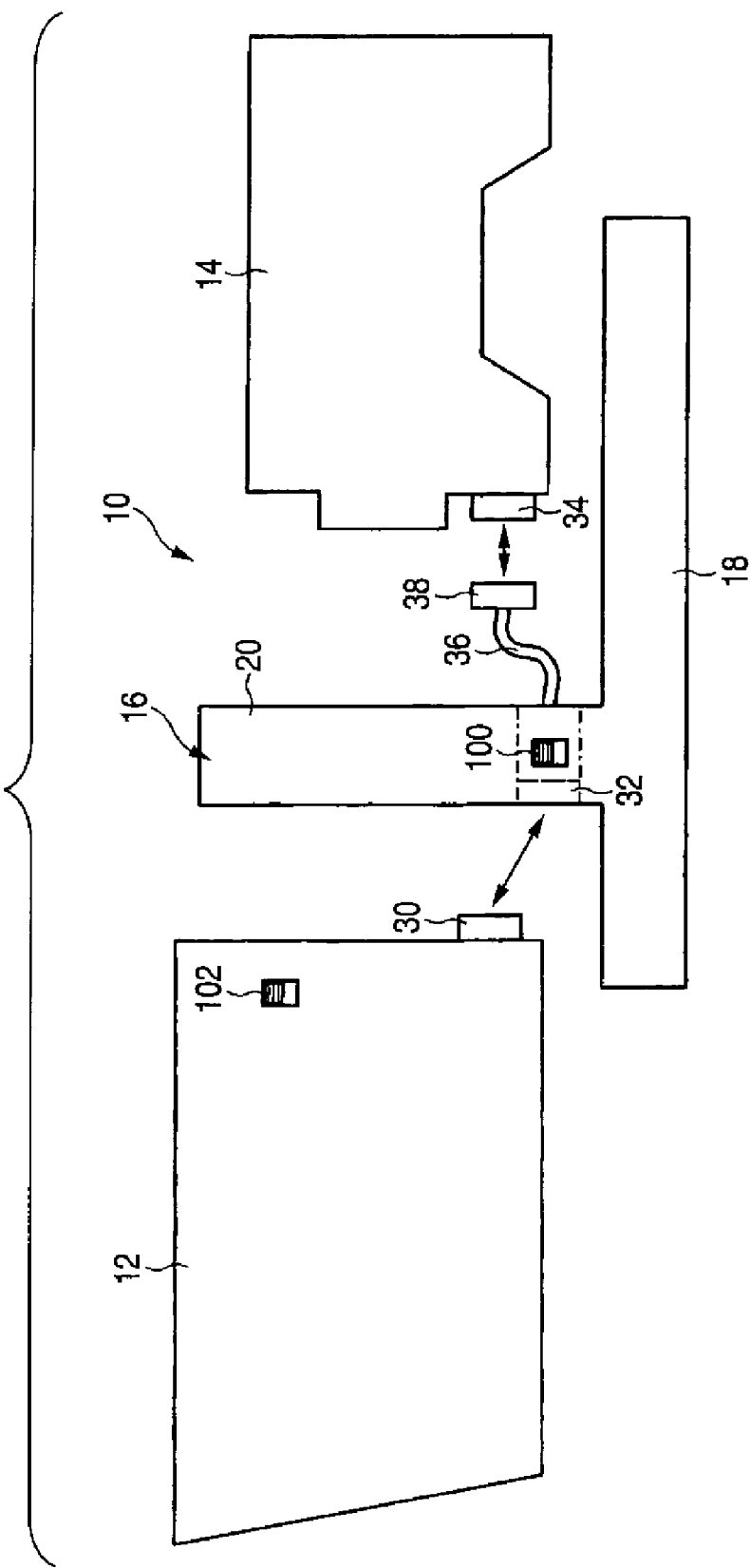
FIG. 13 is a view illustrating a connection mode of electrical connectors among devices of the EFP lens, the ENG camera and a lens supporter.
Figure 14:
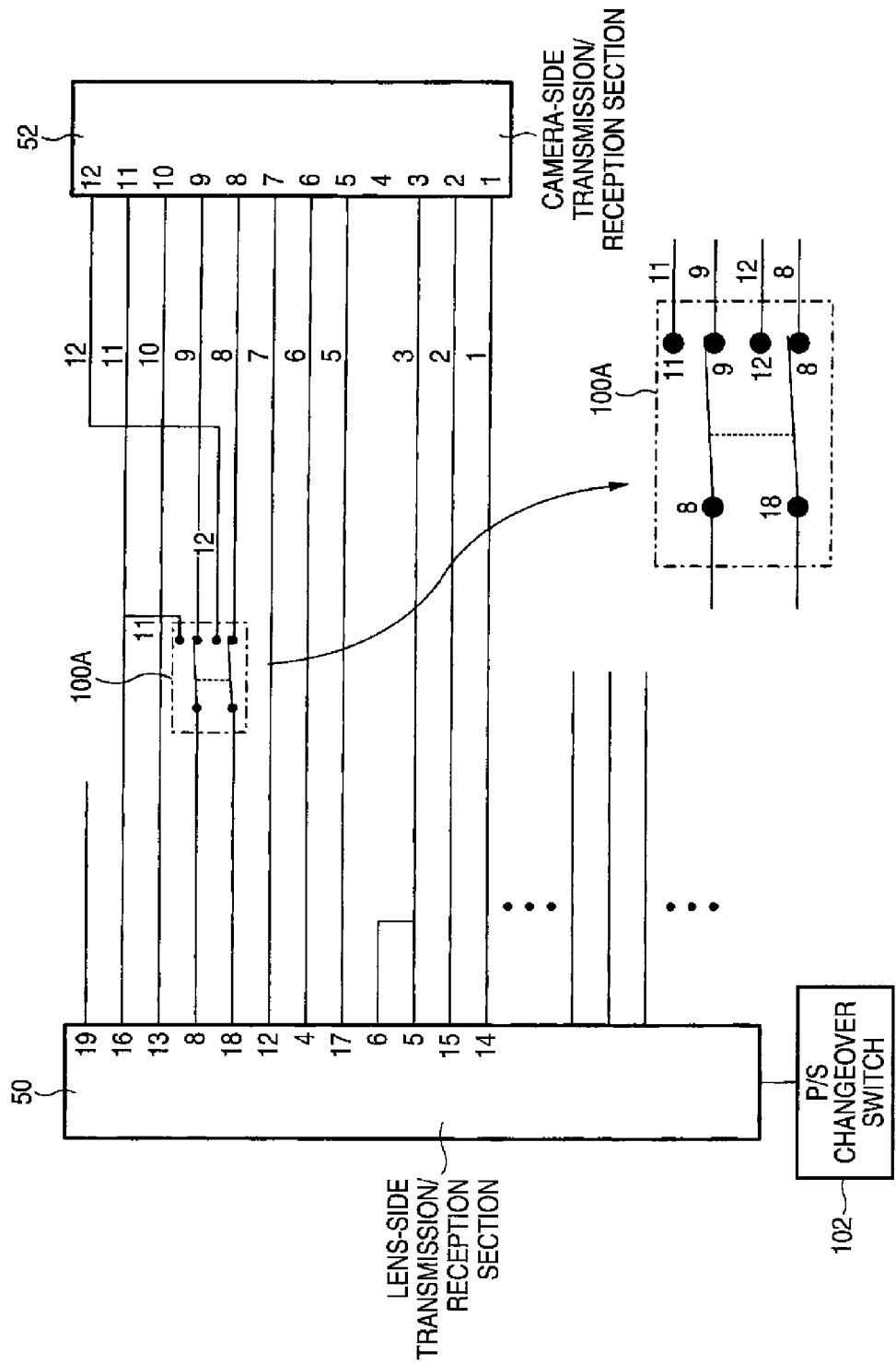
FIG. 14 is a view illustrating a connection state of the signal lines between the EFP lens and the ENG camera according to the connection mode shown in FIG. 13.

FIG. 13 is a view illustrating a connection mode of electrical connectors among devices of the EFP lens 12, the ENG camera 14, and the lens supporter 16. FIG. 14 is a view illustrating a connection state of the signal lines between the EFP lens 12 and the ENG camera 14 according to the connection mode of the connectors shown in FIG. 13. The connection mode in the figure is the same as the connection mode shown in FIG. 2. Also, the same reference numerals are assigned to elements which are the same as or similar to those in FIGS. 2 and 3, and detailed description thereof will be omitted.

Also, when the parallel communication is performed between the EFP lens 12 and the ENG camera 14, two pins (Nos. 8 and 18) of the connector 30 of the EFP lens 12 are connected to two predetermined pins (Nos. 9 and 8) of the connector 34 of the ENG camera 14. When the serial communication is performed between the EFP lens 12 and the ENG camera 14, the two pins (Nos. 8 and 18) are necessary to be connected to different two pins (Nos. 11 and 12) of the connector 34 of the ENG camera 14. Hence, a P/S changeover switch 100 which is manually operated to switch the connection state according to instruction of a manipulator is provided on the lens supporter 16.

When the EFP lens 12 and the ENG camera 14 are connected through the lens supporter 16 as shown in FIG. 13, the terminals of the lens-side transceiver section 50 are connected to the terminals of the camera-side transceiver section 52 by signal lines as shown in FIG. 14. In the figure, a switch 100A represents a switch circuit for switching a connection state by using the P/S changeover switch 100 of the lens supporter 16 shown in FIGS. 12 and 13. The P/S changeover switch 100 is configured to select any of the two states of the parallel communication and the serial communication. When the P/S changeover switch 100 is set to the parallel communication by a manipulator, the switch 100A is set to the connection state shown in the figure in conjunction with this manipulation of the changeover switch 100. Specifically, terminals 8 and 18 of the switch 100A connected to the terminals Nos. 8 and 18 of the lens-side transceiver section 50 are connected to terminals 9 and 8 of the switch 100A connected to the terminals Nos. 9 and 8 of the camera-side transceiver section 52.

Accordingly, when the P/S changeover switch 100 is set to the parallel communication, the respective terminals Nos. 4 to 6, 8, and 12 to 18 of the lens-side transceiver section 50 are connected to the terminals Nos. 1 to 3 and 5 to 11 of the camera-side transceiver section 52 by the signal lines 1 to 3 and 5 to 11 as shown in FIG. 14.

The terminals Nos. 1 to 3 and 5 to 11 of the camera-side transceiver section 52 are terminals of the signal lines used in the parallel communication. When the parallel communication is performed in the EFP lens 12, the terminals Nos. 4 to 6, 8, and 12 to 18 of the lens-side transceiver section 50 corresponding to the types of the signal lines are connected through the signal lines 1 to 3 and 5 to 11. Thereby, it is possible to perform the signal transmission based on the parallel communication between the EFP lens 12 and the ENG camera 14. Also, terminals of the other signal lines of the lens-side transceiver section 50 connected to pins other than pins Nos. 4 to 6, 8, and 12 to 18 of the connector 30 of the EFP lens 12 are omitted in the figure, but are not connected to the camera-side transceiver section 52, and are in an open state.

On the other hand, when the manipulator sets the P/S changeover switch 100 is set to the serial communication, the terminal 8 of the switch 100A is connected to the terminal 11 of the switch 100A connected to the terminal No. 11 of the camera-side transceiver section 52, and the terminal 18 of the switch 100A is connected to the terminal 11 of the switch 100A connected to the terminal No. 12 of the camera-side transceiver section 52 in conjunction with this manipulation of the P/S changeover switch 100.

The terminals Nos. 8 and 18 of the lens-side transceiver section 50 are terminals which are used in both of the parallel communication and the serial communication. Also, the terminals Nos. 11 and 12 of the camera-side transceiver section 52 are terminals used in the serial communication. Accordingly, when the P/S changeover switch 100 is set to the serial communication, it is possible to perform the signal transmission based on the serial communication between the EFP lens 12 and the ENG camera 14.

As shown in FIGS. 12 and 13, the EFP lens 12 is provided with a P/S changeover switch 102 which is manually operated by the manipulator to set whether the signal transmission between the ENG camera 14 and the EFP lens 12 is performed based on the parallel communication (the signal transmission is fixed to the parallel communication mode) or the serial communication (the signal transmission is fixed to the serial communication mode). In the lens-side transceiver section 50, it is determined as to whether the signal transmission between the camera-side transceiver section 52 and the lens-side transceiver section 50 is performed based on the parallel communication or the serial communication, according to the setting state of the P/S changeover switch 102. Then, the signal transmission is initiated based on the determined communication method.

Accordingly, when the manipulator wants to use the parallel communication in the signal transmission between the EFP lens 12 and the ENG camera 14, the manipulator sets the P/S changeover switch 100 of the lens supporter 16 to the parallel communication, and sets the P/S changeover switch 102 of the EFP lens 12 to the parallel communication. Thereby, the signal transmission can be performed between the EFP lens 12 and the ENG camera 14 based on the parallel communication.

On the other hand, when the manipulator wants to use the mode of serial communication in signal transmission between the EFP lens 12 and the ENG camera 14, the manipulator sets the P/S changeover switch 100 of the lens supporter 16 to the serial communication, and sets the P/S changeover switch 102 of the EFP lens 12 to the serial communication. Thereby, the signal transmission can be performed between the EFP lens 12 and the ENG camera 14 based on the serial communication.

The ENG camera 14 selects a communication method so as to be adapted to the communication method in the EFP lens 12. Accordingly, when the EFP lens 12 initiates the parallel communication, the ENG camera 14 also initiates the parallel communication. When the EFP 12 initiates the serial communication, the ENG camera 14 also initiates the serial communication.

According to the television camera system of the fifth embodiment, it is possible to switch the communication method between the EFP lens 12 and the ENG camera 14 with a simple configuration. Also, it is prevented that when a communication error occurs, the communication method between the EFP lens 12 and the ENG camera 14 is automatically switched to the other communication method, and thus it takes time to return to a normal communication state. Accordingly, the fifth embodiment can immediately return to the normal communication state at the time when the communication error occurs.

In the fifth embodiment, the P/S changeover switches 100 and 102 are provided on the lens supporter 16 and the EFP lens 12, respectively. However, the switches may be easily provided on optional positions.

Also, in the fifth embodiment, a method (a communication method) of the signal transmission between the EFP lens 12 and the ENG camera 14 is set by the P/S changeover switch 102. However, if the EFP lens 12 and the ENG camera 14 have a function of automatically detecting a signal transmission method that is available therebetween and starting the signal transmission based on the detected method, a switch for forcedly fixing a signal transmission method to the current method may be provided in place of the P/S changeover switch 102.

What is claimed is:

1. A television camera system comprising:
a lens device
a camera device, wherein the lens device is originally incompatible with the camera device; and
a lens supporter, wherein
the lens device is mounted on a camera device through the lens supporter,
the camera device includes one connector for signal transmission between the lens device and the camera device,
the connector has a terminal for parallel communication and a terminal for serial communication,
the lens device or the lens supporter is provided with a connector for parallel communication and a connector for serial communication which are connectable to the connector of the camera device,
a signal line for parallel communication extending from the lens device is connected to the terminal for parallel communication of the connector of the camera device by connecting the connector for parallel communication to the connector of the camera device, to enable signal transmission based on parallel communication between the lens device and the camera device, and
a signal line for serial communication extending from the lens device is connected to the terminal for serial communication of the connector of the camera device by connecting the connector for serial communication to the connector of the camera device, to enable signal transmission based on serial communication between the lens device and the camera device, wherein
the lens supporter is provided with the connector for parallel communication and the connector for serial communication, and
a predetermined signal line extending from the lens device is connected to each of terminals of the connector for parallel communication and each of terminals of the connector for serial communication through a predetermined connector connection between the lens device and the lens supporter.

2. The television camera system according to claim 1, wherein any one of the connector for parallel communication and the connector for serial communication is connected to the connector of the camera device by a cable.

3. A television camera system comprising:
a lens device a camera device, wherein the lens device is originally incompatible with the camera device; and
a lens supporter, wherein
the lens device is mounted on a camera device through the lens supporter,
the camera device includes one connector for signal transmission between the lens device and the camera device,
the connector has a terminal for parallel communication and a terminal for serial communication,
the lens device or the lens supporter is provided with a connector for parallel communication and a connector for serial communication which are connectable to the connector of the camera device,
a signal line for parallel communication extending from the lens device is connected to the terminal for parallel communication of the connector of the camera device by connecting the connector for parallel communication to the connector of the camera device, to enable signal transmission based on parallel communication between the lens device and the camera device, and
a signal line for serial communication extending from the lens device is connected to the terminal for serial communication of the connector of the camera device by connecting the connector for serial communication to the connector of the camera device, to enable signal transmission based on serial communication between the lens device and the camera device, wherein
the connector for parallel communication includes first and second connectors,
a cable includes
a first cable connector that is connectable to the first connector,
a second cable connector that is connectable to the second connector and the connector for serial communication, and
a third cable connector that is connectable to the connector of the camera device,
the cable connects terminals of the first and second cable connectors to terminals of the third cable connector,
by connecting the first cable connector to the first connector, connecting the second cable connector to the second connector, and connecting the third cable connector to the connector of the camera device, the signal transmission is performed between the lens device and the camera device based on the parallel communication, and
by connecting the second cable connector to the connector for serial communication and connecting the third cable connector to the connector of the camera device, the signal transmission is performed between the lens device and the camera device based on the serial communication.

* * * * *